United States Patent
Seales

(10) Patent No.: US 8,839,968 B2
(45) Date of Patent: *Sep. 23, 2014

(54) TRUCK-MOUNTED CRANE

(75) Inventor: Paul Seales, Port Isabel, TX (US)

(73) Assignee: Impac Manufacturing, Inc., Los Fresnos, TX (US)

(*) Notice: Subject to any disclaimer, the term of this patent is extended or adjusted under 35 U.S.C. 154(b) by 303 days.

This patent is subject to a terminal disclaimer.

(21) Appl. No.: 13/040,073

(22) Filed: Mar. 3, 2011

(65) Prior Publication Data

US 2011/0215065 A1 Sep. 8, 2011

Related U.S. Application Data

(60) Provisional application No. 61/311,091, filed on Mar. 5, 2010.

(51) Int. Cl.
| | |
|---|---|
| *B65F 1/00* | (2006.01) |
| *B60P 1/54* | (2006.01) |
| *B66C 23/44* | (2006.01) |
| *B60P 1/64* | (2006.01) |
| *B60P 1/48* | (2006.01) |

(52) U.S. Cl.
CPC .......... *B60P 1/483* (2013.01); *B60P 1/5428* (2013.01); *B66C 23/44* (2013.01); *B60P 1/6463* (2013.01)
USPC ............ 212/294; 212/255; 212/261; 414/546

(58) Field of Classification Search
USPC ......... 212/271, 175, 177, 294, 299, 255, 258, 212/260, 261; 414/541, 542, 546
See application file for complete search history.

(56) References Cited

U.S. PATENT DOCUMENTS

| | | | | |
|---|---|---|---|---|
| 2,582,111 | A | * | 1/1952 | Eakin ............................ 212/260 |
| 2,639,825 | A | * | 5/1953 | Eakin ............................ 414/546 |
| 2,750,056 | A | | 6/1956 | Dow |
| 2,947,425 | A | | 8/1960 | Nichols |
| 3,207,347 | A | | 9/1965 | Ehrlich |
| 3,481,251 | A | | 12/1969 | Shook |
| 3,533,515 | A | | 10/1970 | Milner |

(Continued)

FOREIGN PATENT DOCUMENTS

JP 2000083436 A 3/2000

OTHER PUBLICATIONS

International Search Report and Written Opinion dated Nov. 23, 2011, International Application No. PCT/US2011/027058.
LegalZoom Patent Search Report dated Feb. 17, 2010.

(Continued)

*Primary Examiner* — Sang Kim
*Assistant Examiner* — Nathaniel Adams
(74) *Attorney, Agent, or Firm* — Patterson & Sheridan, LLP

(57) ABSTRACT

A crane for mounting on a truck includes a base. The base includes a cargo bed welded or fastened to a frame and the frame for fastening to a chassis of a truck. The crane further includes a boom rotatable relative to the base between a vertical position and a horizontal position; a boom hoist operable to raise and lower the boom between the positions; and a load hoist operable to hoist cargo located proximate to a rear end of the truck when the boom is in the vertical position and operable to carry the cargo toward a cab of the truck as the boom is lowered to the horizontal position, thereby loading the cargo onto the cargo bed.

16 Claims, 4 Drawing Sheets

(56) References Cited

U.S. PATENT DOCUMENTS

| | | | |
|---|---|---|---|
| 3,780,878 A | 12/1973 | Morrow | |
| 3,801,132 A | 4/1974 | Haynie et al. | |
| 3,984,019 A | 10/1976 | Brudi et al. | |
| 4,102,528 A | 7/1978 | Cripe | |
| 4,216,869 A | 8/1980 | Grove | |
| 4,239,440 A | 12/1980 | James | |
| 4,265,585 A | 5/1981 | Hawkins | |
| 4,383,791 A * | 5/1983 | King | 414/542 |
| 4,397,396 A | 8/1983 | Kay et al. | |
| 4,613,274 A | 9/1986 | Stapleton | |
| 4,645,084 A | 2/1987 | Deike | |
| 4,710,090 A | 12/1987 | DeLuca et al. | |
| 4,746,263 A | 5/1988 | Cook | |
| 4,763,800 A | 8/1988 | Engler et al. | |
| 4,795,305 A | 1/1989 | Friend | |
| 4,880,346 A | 11/1989 | Brassette | |
| 4,881,864 A | 11/1989 | Amato | |
| 4,964,778 A | 10/1990 | Muto et al. | |
| 4,976,361 A | 12/1990 | Becker | |
| 4,979,865 A | 12/1990 | Strickland | |
| 5,119,961 A | 6/1992 | Runn | |
| 5,199,861 A | 4/1993 | Merlo et al. | |
| 5,445,281 A | 8/1995 | Hung | |
| 5,478,192 A | 12/1995 | Bentivoglio | |
| 5,480,041 A | 1/1996 | Turner | |
| 5,540,537 A | 7/1996 | Welch | |
| 5,730,304 A * | 3/1998 | Duncan | 212/180 |
| 5,927,440 A | 7/1999 | Freeman | |
| 5,931,321 A | 8/1999 | Grant | |
| 6,024,232 A | 2/2000 | Helgesson | |
| 6,089,818 A | 7/2000 | Hill et al. | |
| 6,244,450 B1 | 6/2001 | Woodling | |
| 6,425,727 B1 | 7/2002 | Hood | |
| 6,460,908 B1 * | 10/2002 | Green | 293/117 |
| 6,494,437 B1 | 12/2002 | Boyer | |
| 6,626,621 B1 * | 9/2003 | Hugg | 410/103 |
| 7,189,048 B2 * | 3/2007 | Rinderknecht | 414/546 |
| 8,534,981 B1 * | 9/2013 | Bortz | 414/546 |
| 2003/0082038 A1 | 5/2003 | Nolasco | |
| 2004/0018074 A1 | 1/2004 | Elder | |
| 2006/0133916 A1 | 6/2006 | Wood | |
| 2008/0279668 A1 * | 11/2008 | Alexander | 414/607 |
| 2009/0115238 A1 | 5/2009 | Lane | |

OTHER PUBLICATIONS

Seaeye Marine Ltd.—Launch & Recovery Systems (LARS)—'A' Frame System, date unknown.

Ford 2009 Body Application Guide—E-Series, F-Series, F-650/F-750, Ford LCF, Jun. 2008.

Australian Patent Examination Report No. 1 dated Jul. 12, 2013, Australian Patent Application No. 2011223524.

Canadian Office Action dated Nov. 19, 2013, in Canadian Patent Application No. 2,791,616.

* cited by examiner

TRUCK-MOUNTED CRANE

CROSS-REFERENCE TO RELATED APPLICATIONS

This application claims benefit of U.S. Provisional App. No. 61/311,091, filed Mar. 5, 2010, which is hereby incorporated by reference in its entirety.

BACKGROUND OF THE INVENTION

1. Field of the Invention

Embodiments of the present invention generally relate to a truck-mounted crane.

2. Description of the Related Art

Loading and unloading cargo onto/from trucks has typically been accomplished using a forklift. A forklift is an expensive and cumbersome piece of equipment. When picking up or delivering cargo to/from locations in the field, a forklift has to be transported with the truck. Transporting the forklift requires towing a trailer.

SUMMARY OF THE INVENTION

Embodiments of the present invention generally relate to a truck-mounted crane. In one embodiment, a crane includes a base. The base includes a cargo bed welded or fastened to a frame and the frame for fastening to a chassis of a truck. The crane further includes a boom rotatable relative to the base between a vertical position and a horizontal position; a boom hoist operable to raise and lower the boom between the positions; and a load hoist operable to hoist cargo located proximate to a rear end of the truck when the boom is in the vertical position and operable to carry the cargo toward a cab of the truck as the boom is lowered to the horizontal position, thereby loading the cargo onto the cargo bed.

In another embodiment, a truck includes an engine; four or more wheels, at least one wheel operably coupled to the engine; and a cab. The cab includes a steering wheel; an accelerator pedal; a brake pedal; and a gear shifter. The truck further includes a chassis; and a crane. The crane includes a cargo bed welded or fastened to the chassis; a boom pivoted to the chassis and rotatable relative to the chassis between a vertical position and a horizontal position; a boom hoist operable to raise and lower the boom between the positions; and a load hoist operable to hoist cargo located proximate to a rear end of the truck when the boom is in the vertical position and operable to carry the cargo toward the cab as the boom is lowered to the horizontal position, thereby loading the cargo onto the cargo bed.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 2A illustrates the truck-mounted crane in the vertical position hoisting cargo. FIG. 2B illustrates the truck-mounted crane in an intermediate position. FIG. 2C illustrates the truck-mounted crane in a horizontal position having loaded the cargo onto the truck.

DETAILED DESCRIPTION

Figure 1:
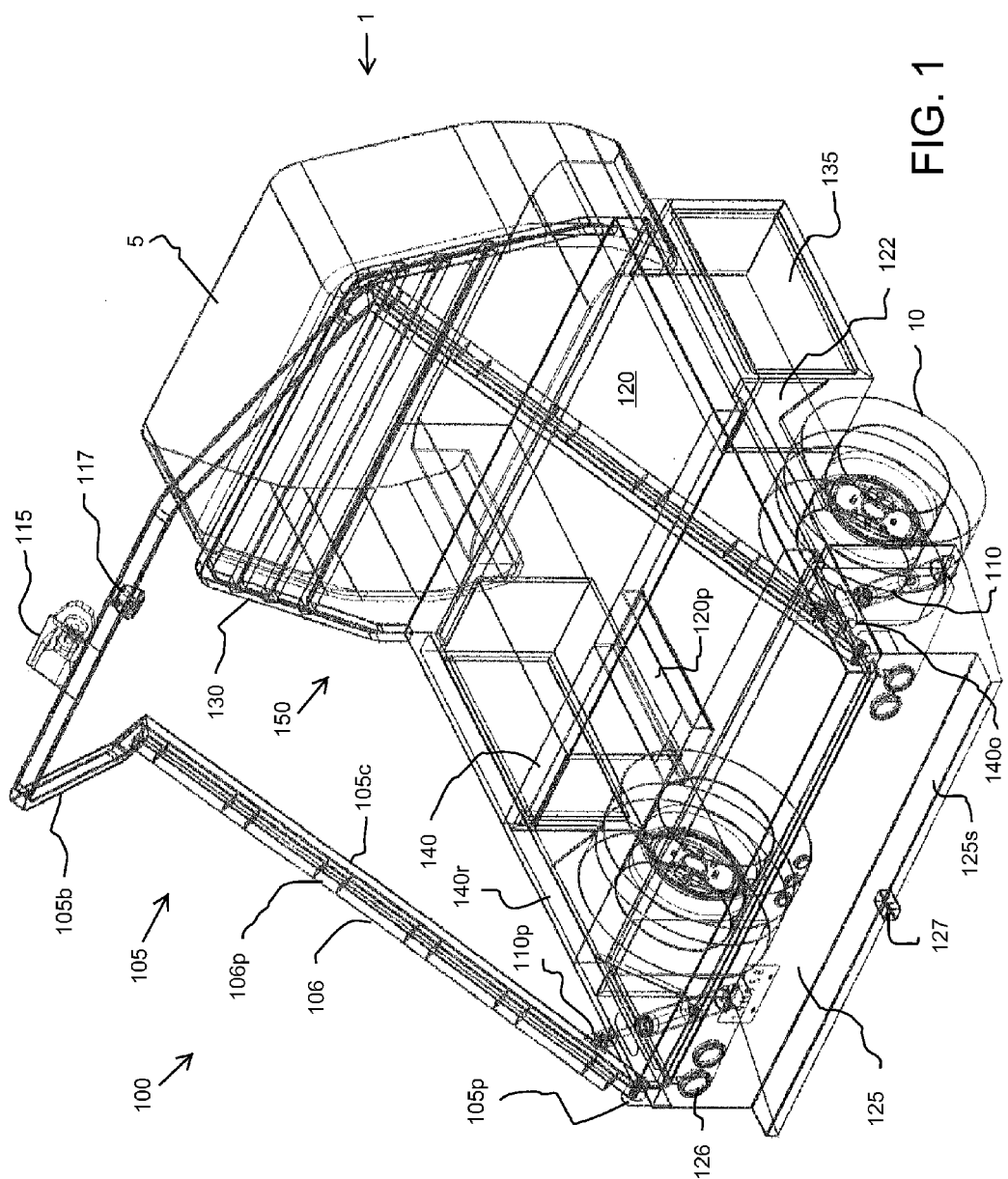
FIG. 1 illustrates a truck-mounted crane, according to one embodiment of the present invention.

FIG. 1 illustrates a truck-mounted crane 100, according to one embodiment of the present invention. The crane 100 may be fastened to a chassis of a pickup truck 1, such as a chassis cab truck. The truck 1 may include a cab 5, such as a standard, extended, or crew cab. The truck 1 may further include an engine (not shown), such as a gasoline, diesel, hybrid, or natural gas. The front portion of the truck 1, especially the engine, may serve as a counterweight for the crane 100. The cab 5 may further include a steering wheel, a driver's seat, such as a chair or bench, a gear shifter, an accelerator pedal, a brake pedal, and other instruments and controls. The truck 1 may further include a transmission, such as a standard or automatic, a drive shaft, a rear differential, and two or more axles. The truck 1 may further include four or more wheels 10, such as six. The truck 1 may be rear wheel drive or four wheel drive. Alternatively, the crane 100 may be mounted on a semi-trailer, such as a low-boy or flat bed and may include a counterweight.

The crane 100 may include a boom 105, a boom hoist 110, a load hoist 115, and a base 150. The base 150 may include a cargo bed 120, a rear bumper 125, cab protector 130, one or more utility boxes 135, a frame 140, power unit (not shown), and controller (not shown). The crane 100 may have a load capacity corresponding to a cargo capacity of the truck 1, such as greater than or equal to one-half ton, three-quarter ton, one ton, one and one-half ton, or two tons.

The boom 105 may include one or more structural members, such as columns 105c and beams 105b. The boom 105 may be made from a high strength metal or alloy, such as steel. The steel may be plain carbon, low alloy, or stainless. The structural members 105b,c may be rectangular (i.e., square) tubing or other structural shapes, such as C, L, I, or pipe. The structural members 105b,c may be welded together or fastened together, such as using bolts and nuts. The boom 105 may be pivoted 105p to the frame 140 using fasteners and bearings or bushings. The pivots 105p may be located at a rear end of the frame 140. The boom 105 may form a three dimensional shape. The columns 105c may be parallel to a longitudinal axis of the truck 1 in the horizontal position and may be spaced apart a distance corresponding to the width of the cab 5, such as five to nine feet. A length of each column 105c may correspond to a length of a cargo portion of the chassis, such as six to sixteen feet. The beams 105b may form a shape conforming to a shape of the cab 5 and cab protector 130, such as an isosceles trapezoid (minus the long base). A height of the trapezoidal portion may correspond to a height of the cab above the cargo portion of the chassis, such as two to six feet.

The boom 105 may further include a rail 106 fastened or welded to each column 105c. Each rail 106 may be disposed along an outer surface of each column 105c. Each rail 106 may have stake pockets 106p formed therein and the stake pockets may be spaced along each rail at regular intervals. The stake pockets 106p may receive stakes (not shown) for securing the cargo 205. The rails 106 may be made from any of the materials and shapes discussed above for the columns 105c and beams 105b.

The boom 105 may be rotated about the pivots 105p relative to the base 150 between a vertical position and a horizontal position by the boom hoist 110. The boom hoist 110 may include one or more hydraulic piston and cylinder assemblies 110 (PCAs). A first end of each PCA 110 may be pivoted 110p to each column 105c and a second end of each PCA may be pivoted to the frame 140. Extension of each PCA 110 may raise the boom 105 and retraction of each PCA may lower the boom. Alternatively, an electric motor and lead screw may be used instead of each PCA 110.

The bed 120 may be a rectangular plate formed from any of the boom materials, discussed above. A width of the bed 120 may correspond to a width of the cab. A length of the bed 120 may correspond to a length of a cargo portion of the chassis. The bed 120 may extend past the chassis to cover the bumper 125. The bed 120 may have a pocket 120p formed therein. A trailer hitch ball 121 (see FIG. 2A) may be disposed in the pocket 120p and fastened to the frame 140 sub-flush with the bed so as not to interfere with cargo hauling. The trailer hitch ball 121 may receive a gooseneck of a trailer (not shown).

The frame 140 may be fastened or welded to the bed 120 and may be fastened to the truck chassis. Alternatively, the frame 140 may be welded to the chassis. The frame 140 may be made of any of the shapes and materials discussed above for the boom 105. The frame 140 may form a recess 140r. Each recess 140r may receive a corresponding column 105c and rail 106 in the horizontal position so that the column and rail is flush or substantially flush with the bed 120. The frame 140 may have an opening 140o formed through a surface defining the recess 140r for passage of each PCA 110. Alternatively, the crane 100 may be manufactured with the truck 1 so that the chassis and the frame 140 may be integral.

The cab protector 130 (a.k.a. headache rack) may serve to protect a rear window of the cab 5 from shifting cargo 205. The cab protector 130 may be made from columns and beams and have an outer shape conforming to the cab shape, such as an isosceles trapezoid. The columns and beams may be any of the shapes and materials discussed above for the boom 105. The cab protector 130 may be coupled to the bed 120 by reception of column ends by stake pockets formed in the bed. Alternatively, the cab protector 130 may be fastened or welded to the bed 120 or frame 140.

The base 150 may further include panels 122. The panels 122 may be made from plates or sheets formed from any of the boom materials, discussed above. The panels 122 may be welded or fastened to the frame 140.

The bumper 125 may be made from plate formed from any of the boom materials, discussed above. A width of the bumper 125 may correspond to a width of the cab 5. The bumper 125 may be fastened or welded to the frame 140 and/or the chassis. The bumper 125 may have one or more compartments formed therein. The bumper 125 may include a compartment for each PCA 110. The bumper 125 may further include another compartment to house the power unit and controls. Tail lights 126 may be fastened to the bumper 125. A hitch receiver 127 may also be fastened or welded to the bumper 125. The bumper may form one or more steps 125s to facilitate climbing of the driver onto the bed 120.

The power unit may include a hydraulic fluid reservoir, a hydraulic pump operable to pressurize the hydraulic fluid, a manifold (including valves), and a hydraulic conduit. The hydraulic pump may be electric and compatible with the truck's accessory power system, such as twelve VDC. Alternatively, the hydraulic pump may be located in the engine compartment and connected to the crankshaft via the serpentine belt. Alternatively, the hydraulic pump may be driven by a power take off shaft connected to the powertrain at any location therealong, such as at the transmission (rear wheel drive or four wheel drive) or transfer case (four wheel drive). In either alternative, a clutch may be in communication with the controller to selectively engage the hydraulic pump with the engine or transmission. A hydraulic conduit, such as tubing, may extend from the manifold to each PCA 110. The manifold may be in fluid communication with an outlet of the pump and the reservoir. An inlet of the pump may be in fluid communication with the reservoir. The controller may be operably coupled to the pump and the manifold valves.

The load hoist may be a winch 115 fastened to the boom 105. The winch 115 may be fastened to a beam 105b parallel to a width of the truck at a center of the beam 105b. The winch 115 may include a load line 116, such as steel wire rope, a drum having the wire rope wrapped there-around, a housing, a motor, and a brake. The motor may be electric and compatible with the truck's accessory power system. Alternatively, the motor may be hydraulic. An electrical conduit (not shown) may lead within or along the boom 105 to the controls. The crane 100 may further include a floodlight 117 fastened to the boom 105. Another electrical conduit may lead from the floodlight 117 to the controls within or along the boom.

The controller may include a driver-operable interface, such as levers or buttons, for selectively operating the PCAs 110, the load hoist 115, and the floodlight 117. The controller may plug into and be compatible with the truck's accessory power system. The controller may be located in a side compartment of the bumper 125 so that the driver may stand clear of the cargo 205 as it is being hoisted and loaded.

The utility boxes 135 may each be fastened or welded to the frame 140. The utility boxes 135 may be made from plate or sheet formed from any of the boom materials, discussed above. Each utility box may include a door (not shown) having a lock. The utility boxes 135 may stow stakes, chains, and/or straps for securing the cargo 205 once the cargo is hoisted and loaded. The utility boxes 135 may also stow one or more hoisting accessories (not shown) for the load line 116, such as a sling, or one or more accessories for the boom, such as cross-braces, for loading a bail of hay.

Figure 2A:
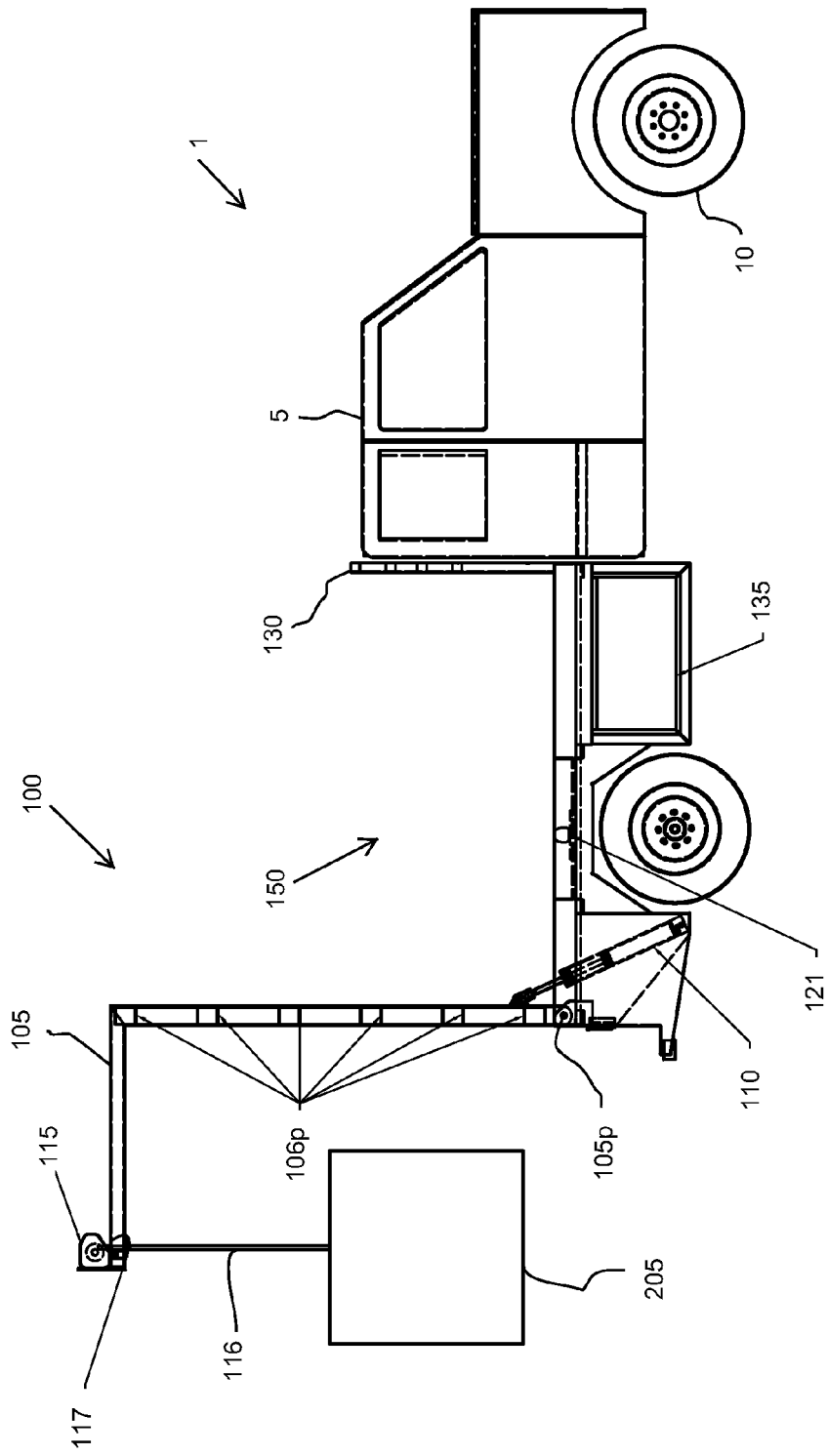
FIGS. 2A-2C illustrate operation of the truck-mounted crane.
Figure 2B:
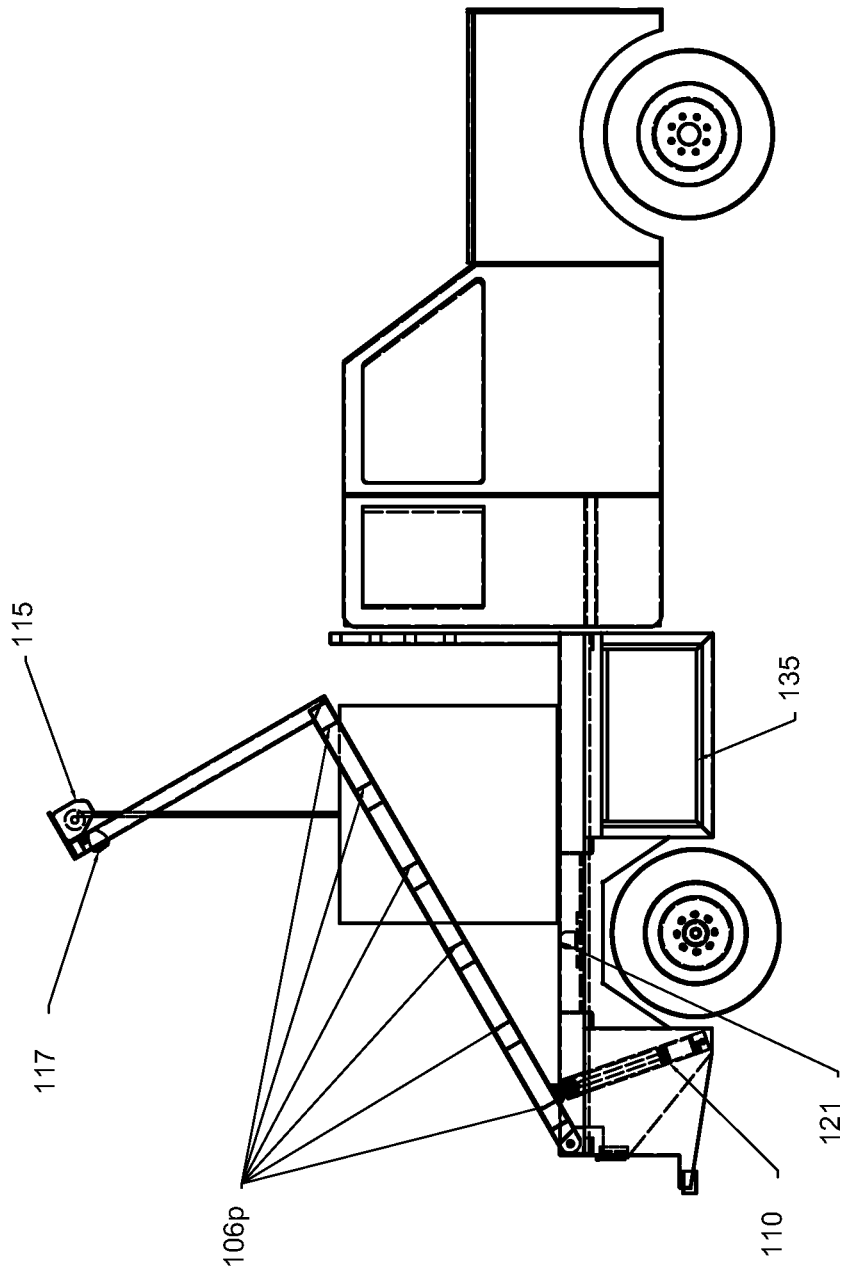
Figure 2C:
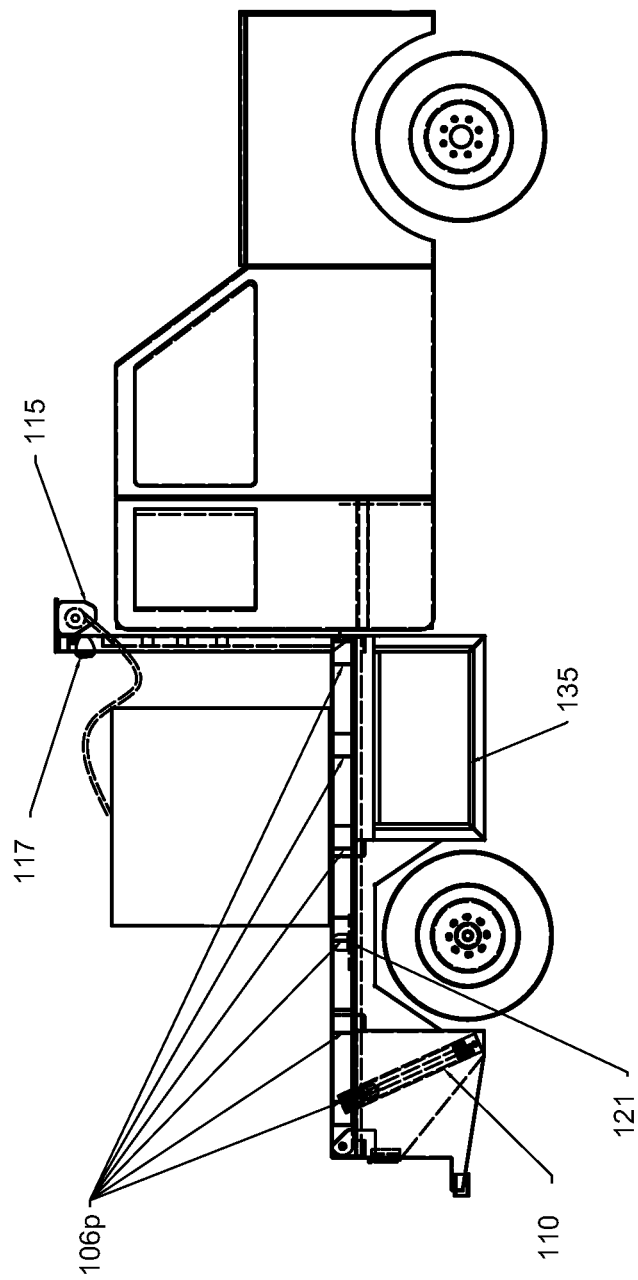

FIGS. 2A-2C illustrate operation of the truck-mounted crane 100. FIG. 2A illustrates the truck-mounted crane 100 in the vertical position hoisting cargo 205. FIG. 2B illustrates the truck-mounted crane 100 in an intermediate position. FIG. 2C illustrates the truck-mounted crane 100 in a horizontal position having loaded the cargo 205 onto the truck 1.

The cargo 205 may include items, such as hay bails, animal carcasses, or a sump pump. Once the driver has backed the truck 1 into proximity of the cargo 205, the driver may park the truck. The driver may then exit the truck 1 and access the controller. The driver may then raise the boom 105 to the vertical position by operating the PCAs 110. The boom 105 may extend longitudinally away from the truck 1 in the vertical position, thereby placing the winch 115 at a position to hoist the cargo 205 located proximately behind the bumper 125. The driver may then operate the winch 115 to lower the load line 116 to the cargo 205. The driver may then fasten the load line 116 to the cargo. The driver may then operate the winch 115 to hoist the cargo 205 such that a bottom of the cargo is aligned or just above the bed 120.

The driver may then operate the PCAs 110 to move the boom 105 to the horizontal position. As the boom 105 is lowered to the horizontal position, the winch 115 may carry the cargo 205 forward along a longitudinal path toward the cab 5 until the cargo rests on the bed 120, thereby also loading the cargo onto the truck 1. The winch 115 may rest at a position proximate to a rear end of the cab 5 in the horizontal position. Once in the horizontal position, the driver may secure the cargo 205 to the frame 140. The load line 116 may be left connected to the cargo 205 and serve as a back-up should the cargo break-free of tie-downs. The driver may enter the truck and transport the cargo. Once reaching the destination, the driver may unload the cargo by reversing operation of the crane 100.

While the foregoing is directed to embodiments of the present invention, other and further embodiments of the invention may be devised without departing from the basic scope thereof, and the scope thereof is determined by the claims that follow.

The invention claimed is:

1. A crane for mounting on a truck having a cab, a chassis, a rear end, and rear wheels, the crane comprising:
   a base, comprising:
      a cargo bed welded or fastened to a frame; and
      the frame for fastening to the chassis, wherein the frame forms a recess;
   a rear bumper having compartments and fastened or welded to the frame of the crane,
   a boom rotatable relative to the base between a vertical position and a horizontal position and configured to fit into the recess formed in the frame when in the horizontal position, having a pair of columns and one or more beams forming a three dimensional shape for extending longitudinally away from the truck in the vertical position and having a length ranging from six to sixteen feet, a width ranging from five to nine feet, and a height ranging from two to six feet;
   a pair of pivots located at a rear of the cargo bed and fastening the columns to the frame of the crane;
   a boom hoist comprising a pair of piston and cylinder assemblies (PCAs), wherein:
      extending the PCAs raises the boom in a single motion and retraction of the PCAs lowers the boom in a single motion,
      a first end of the PCAs is fastened to the columns above the pivots, and
      a second end of each PCA is fastened to the frame in a separate one of the compartments below the cargo bed and for being located behind the rear wheels,
   a load hoist fastened to the beams and operable to hoist cargo located proximate to the rear end when the boom is in the vertical position and operable to carry the cargo toward the cab as the boom is lowered to the horizontal position, thereby loading the cargo onto the cargo bed; and
   wherein the three dimensional shape of the boom allows the cargo to be carried and loaded without having to further operate the load hoist.

2. The crane of claim 1, wherein the beams form an isosceles trapezoid (minus a long base).

3. The crane of claim 2, wherein the boom further comprises a rail fastened or welded to each column, each rail having stake pockets formed therealong.

4. The crane of claim 1, wherein the load hoist comprises an electric winch.

5. The crane of claim 4, further comprising a hydraulic power unit for operating the PCAs.

6. The crane of claim 1, further comprising a controller disposed in a side compartment of the rear bumper for operation of the boom hoist and load hoist.

7. The crane of claim 1, further comprising one or more utility boxes fastened or welded to the frame.

8. A truck, comprising:
   an engine;
   four or more wheels, at least one wheel operably coupled to the engine;
   a cab, comprising:
      a steering wheel;
      an accelerator pedal;
      a brake pedal; and
      a gear shifter;
   a chassis; and
   a crane, comprising:
      a cargo bed welded or fastened to the chassis;
      a three dimensional boom:
         rotatable relative to the chassis between a vertical position and a horizontal position,
         extending longitudinally away from the truck in the vertical position, comprising a pair of columns,
         further comprising one or more beams forming a shape conforming to a rear portion of the cab above a cargo portion of the chassis,
         having a length corresponding to a length of the cargo portion,
         having a width corresponding to a width of the cab, and
         having a height corresponding to a height of the cab above the cargo portion;
      a pair of pivots located at a rear of the cargo bed and fastening the columns to the chassis;
      a boom hoist comprising a pair of piston and cylinder assemblies (PCAs), wherein extending the PCAs raises the boom in a single motion and retraction of the PCAs lowers the boom in a single motion;
      a load hoist fastened to the beams and operable to hoist cargo located proximate to a rear end of the truck when the boom is in the vertical position and operable to carry the cargo toward the cab as the boom is lowered to the horizontal position, thereby loading the cargo onto the cargo bed,
      wherein:
         the three dimensional boom allows the cargo to be carried and loaded without having to further operate the load hoist,
         a first end of the PCAs is fastened to the columns above the pivots, and
         a second end of the PCAs is fastened to the chassis below the cargo bed and behind the rear wheels.

9. The truck of claim 8, wherein the boom further comprises a rail fastened or welded to each column, each rail having stake pockets formed therealong.

10. The truck of claim 8, wherein the load hoist comprises an electric winch.

11. The truck of claim 10, further comprising a hydraulic power unit for operating the PCAs.

12. The truck of claim 8, further comprising a rear bumper fastened or welded to the chassis, wherein the PCAs are disposed in rear compartments of the rear bumper.

13. The truck of claim 12, further comprising a controller disposed in a side compartment of the rear bumper for operation of the boom hoist and load hoist.

14. The truck of claim 8, further comprising one or more utility boxes fastened or welded to the chassis.

15. The truck of claim 8, wherein:
   the cargo bed is flat, and
   the chassis has a recess for receiving the columns in the horizontal position so that the columns are flush with the bed.

16. The crane of claim 1, wherein:
   the cargo bed is flat, and
   the columns fit in the recess so that the columns are flush with the bed.

* * * * *